June 10, 1952  P. M. FARMER  2,599,906
ARTICLE DISPENSING AND DISTRIBUTING SYSTEM
Filed June 16, 1945  4 Sheets-Sheet 3

*INVENTOR.*
P. M. FARMER
BY
*ATTORNEY*

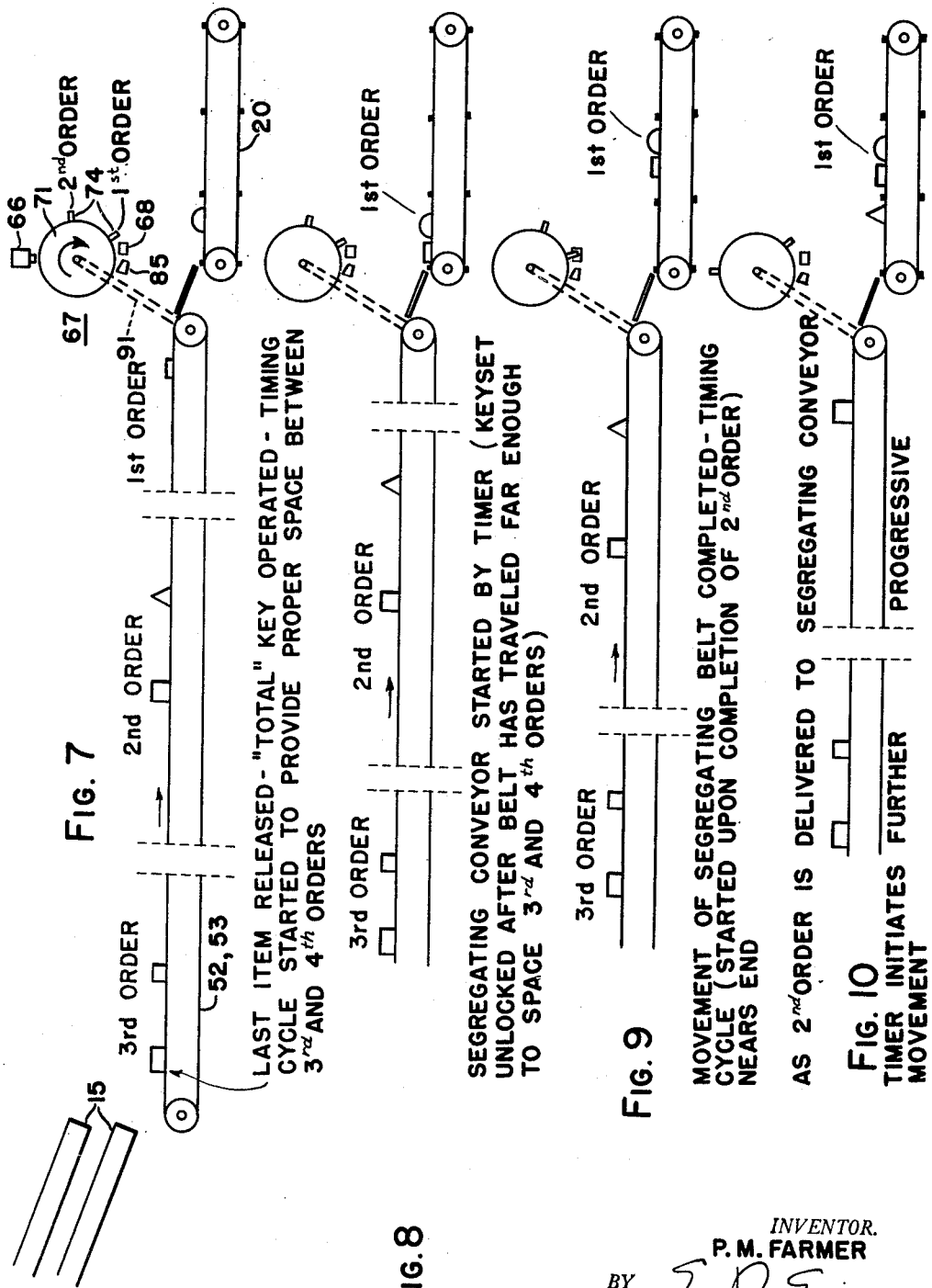

Patented June 10, 1952

2,599,906

UNITED STATES PATENT OFFICE 2,599,906

ARTICLE DISPENSING AND DISTRIBUTING SYSTEM

Paul M. Farmer, West Orange, N. J.

Application June 16, 1945, Serial No. 599,888

9 Claims. (Cl. 186—1)

This invention pertains to an improved system and apparatus for selecting and distributing or delivering articles from storage areas to a wrapping or collection point, and more particularly to a system of this character designed to handle efficiently a multiplicity of different items or articles of merchandise.

Article-handling systems embodying banks or tiers of storage bins, with conveyors for distributing selected items to a collection point or wrapping station are known in the art. The efficiency of such systems, especially with regard to the time delay required for their operation, is adversely affected if the number of different items handled is large. In many applications, such as in large retail stores or mail-order houses, there are thousands of separate items to be handled, requiring an extensive storage area. The additional length of the conveyor system increases the time required to transfer selected articles from the storage area to the collection point and, in general terms, the object of the present invention is to provide an arrangement of and controls for such a system which will function rapidly and efficiently.

In my prior Patent No. 2,276,294, granted March 17, 1942, I have disclosed an apparatus for automatically segregating separate orders or lots of articles at a delivery point or station. The purpose of this arrangement is to keep the items of separate orders in separate groups even though the system provides a substantially continuous flow of articles to the point of delivery. It is a further object of the present invention to correlate the operation of selecting, conveying and segregating apparatus in a large system of this character so that the articles of separate orders are segregated without unduly delaying the operation, as would be the case if the selection were held up at the end of each order until the final article selected was delivered to the collection point. A further object is to automatically and concurrently prepare billing papers for each order as it is assembled.

A still further object of the invention is to provide an improved article-handling system of the keyboard-controlled type.

Other objects and advantages of my invention will appear from the following description of the preferred embodiment thereof shown in the accompanying drawings, wherein:

Figs. 7-10 are explanatory diagrams illustrating the successive steps in the operation of the control system shown in Figs. 1-4.

Figure 1:
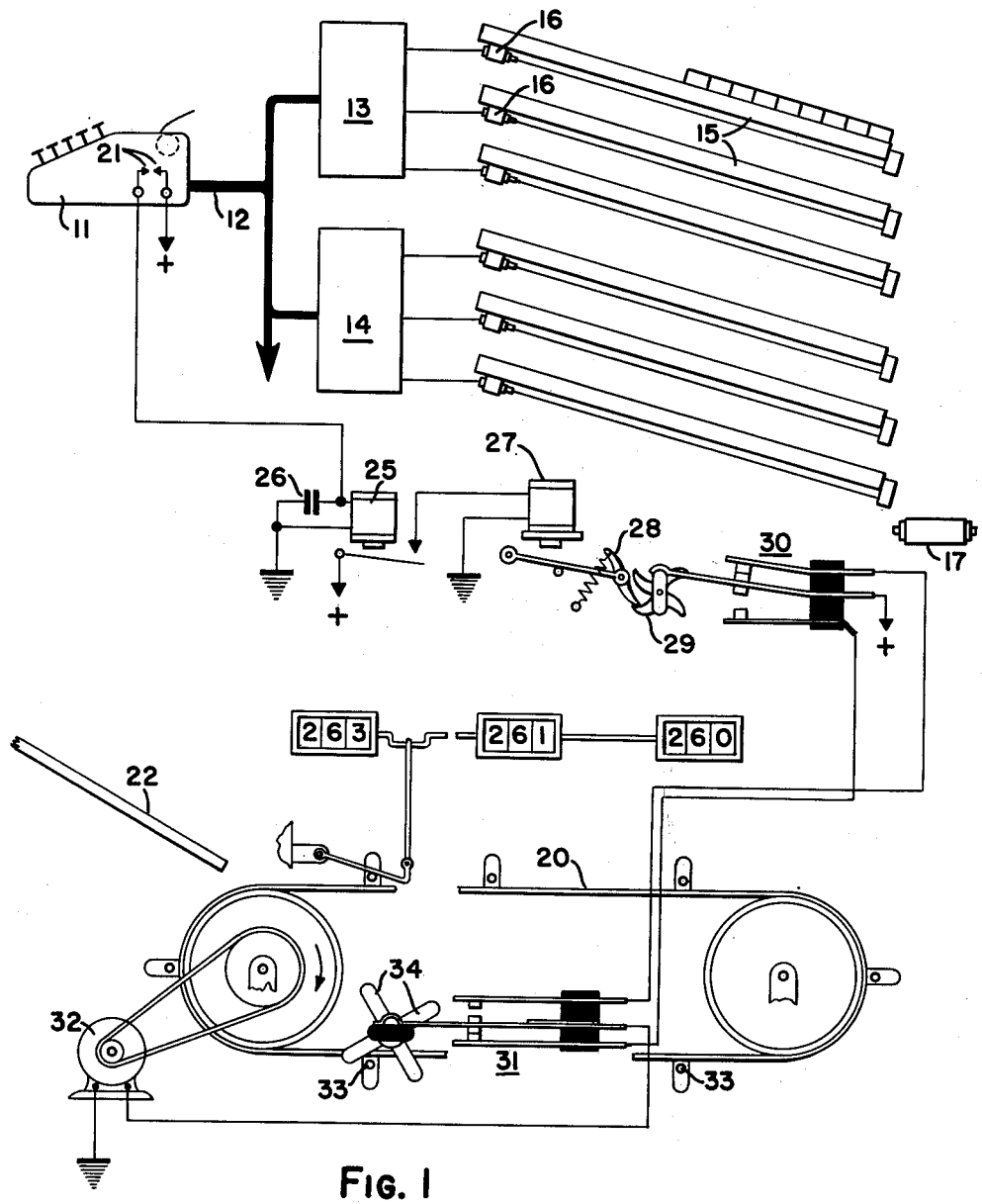
Fig. 1 is a diagrammatic view of a system in which the invention may be utilized, and including a control keyboard, a series of dispensing elements for storing and releasing articles for distribution, an order-segregating belt and control relays for the dispensing elements and order-segregating mechanism.

Referring to the drawings, the selective dispensing and distribution system shown in Fig. 1 incorporates certain features of my prior patents, as will be explained, although the invention is not limited thereto. As shown, the system comprises a control keyboard 11 connected by a cable 12 to groups of selective relays, of which two are indicated at 13 and 14. Articles to be selected and brought to a delivery point are stored in dispensing elements 15, each provided with an actuating solenoid 16 connected to be selectively energized by the relays under the control of the keyboard 11. The electrical control circuits of the keyboard and selective relays may be, for example, similar to those shown in detail in my prior Patent No. 2,276,293, granted March 17, 1942, or No. 2,446,643 granted August 10, 1948. The detailed construction of the dispensing elements 15 may be similar to that shown in my prior Patent No. 2,353,394, granted July 11, 1944, or any other type adapted to be remotely controlled from the control station represented by the keyboard 11. In this manner, any desired one of a multiplicity of articles stored on the dispensing elements 15 may be instantaneously released upon a conveyor system 17 for transfer to a wrapping station or other collecting point. The latter may be located adjacent the keyboard 11 but where there are many items to be handled, at least some of the elements 15 will be at a comparatively remote location. Often it is convenient or necessary that the entire storage area be located a considerable distance from the delivery point.

The conveyor 17, which may be a belt conveyor as shown, transfers the selected articles to an article order-segregating unit 20, the front end of which is shown as positioned underneath a delivery apron 22 which may be located at the delivery end of the conveyor 17. This unit is shown in Fig. 1 as being of the belt-conveyor type, as disclosed in my prior Patent No. 2,276,294 above referred to, but may take the form of a rotating table or the like as explained in said patent. Obviously a pallet type of conveyor might be used instead of the conventional belt type of conveyor, or, separate pallets or trays on rollers or roller conveyors might be used, to be shifted by power, by gravity or manually. At the end of each separate order, i. e., after the selection of the last item in a particular order, the contacts 21 at the control station are closed, which after a proper interval of time cause the order-segregating unit 20 to advance one step, thereby positioning an empty section of the unit beneath the chute or apron 22 at the delivery end of the conveyor. In this manner, the orders are separated at the wrapping station. The contacts 21 may be arranged to be operated by the "total" key of the keyboard 11, in case a printing and accumulating mechanism is provided for printing a sales slip as is customary in retail stores, or the contacts may be manually operated by a separate key after the final item selection of each order.

The momentary closure of the contacts 21 energizes a relay 25 connected in series relation with said contacts. A shunt condenser 26 may be provided to impart a slow-release characteristic to relay 25. The front contacts of said relay close the circuit of a magnet 27, the armature of which carries a pivoted pawl 28 engaging a ratchet mechanism 29 arranged to operate transfer contacts 30. The contacts 30, together with the transfer contacts 31 associated with the segregating unit, control the circuit of a motor 32 to advance the unit one step each time the magnet 27 releases its armature, as explained in Patent No. 2,276,294 above referred to. The transfer contacts 31, as shown, are actuated by pins 33 carried by the partition or boundary elements of the segregating conveyor through a star wheel 34. It will be apparent that the slow-release of relay 25 delays the advance of the segregating conveyor for a predetermined time interval after the closure of contacts 21. The purpose of this time delay is explained below.

It will be seen that the rate of handling individual orders depends upon the actual time required to release the ordered items plus the delay interval or separation time between orders which is essential to transport the items and to prevent mixing the items of an order with those of the preceding or the succeeding order. The selection control and releasing mechanism, as described in my prior patents, operate accurately with such rapidity that the release of any item occurs instantaneously after the selection number is set up on the keyboard. No appreciable time is required for the transmission of coded impulses or the like, as in some control systems. The delay interval or separation time between orders may well consume much more time than is required to release the selected items. Reducing this separation time is therefore of very great importance in improving the handling rate of such a system.

If in an installation as illustrated by Fig. 1 the merchandise drops directly from dispensers 15 to chute 22 and on to order segregating unit 20, the transport time will be practically negligible. The necessary delay interval or separation time will then need be but little more than the time necessary for the order segregating unit belt to advance one position to withdraw the loaded station and present an empty one for the next succeeding order.

Now in order to handle a great number of varieties of items, many additional columns of dispensing elements 15 would be provided in bank formation alongside of those illustrated in Fig. 1. To transport merchandise dispensed by these, a continuously running conveyor belt 17 would be provided on a level lower than that of the lowest dispensers and running from the most remote column of dispensers, past all of the other dispensers and terminating at the delivery chute 22. With this arrangement the delay interval or separation time between orders would have to be increased by an amount equal to the time required to transport an item from the most remote dispensing element to delivery chute 22. As the number of varieties of items being handled are increased and dispensers extended further, this transfer time increases and the order handling rate is correspondingly decreased.

Figure 2:
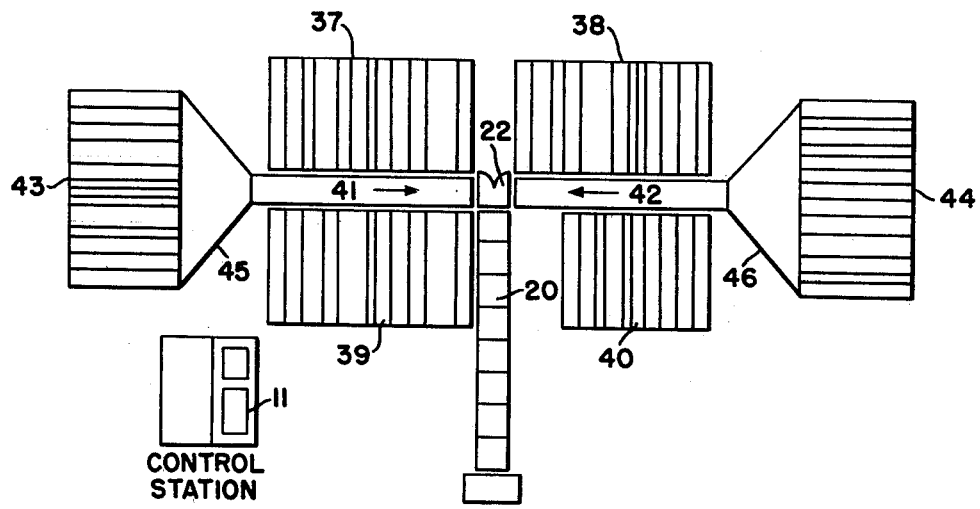
Figs. 2 and 3 are plan views showing preferred arrangements of the dispensing elements where a multiplicity of articles are to be stored and distributed.

In order to decrease the time delay between separate orders and thus increase the efficiency of the system, the storage units and conveyor may be arranged as shown in Fig. 2. As shown in this figure, banks of dispensing units 37, 38, 39 and 40 are disposed on both sides of two conveyor belts 41 and 42, both discharging released items on the segregating unit 20 through the deflector plate or apron 22. Other banks of dispensing units 43 and 44 may be disposed at the outer ends of the conveyor belts 41 and 42. Aprons 45 and 46 are provided to receive articles or packages released from the dispensing units and guide them onto the conveyor belts. It will be understood that each bank of dispensing units includes vertical and horizontal rows, compactly arranged. In this manner, several hundred or more items can be handled without requiring excessive time for transferring any item to the segregating unit. The keyboard at the control station is indicated at 11. If necessary, the segregating unit 20 can be spaced from the apron 22 and an additional conveyor employed to transfer articles from said apron to the segregating unit. This involves merely the additional time delay for such transfer. This added time naturally decreases the handling rate unless the further timing feature described hereinafter be utilized. Through its use the length of the conveyor run from the nearest dispenser to the order segregating unit may be increased indefinitely without affecting the order handling rate.

Figure 3:
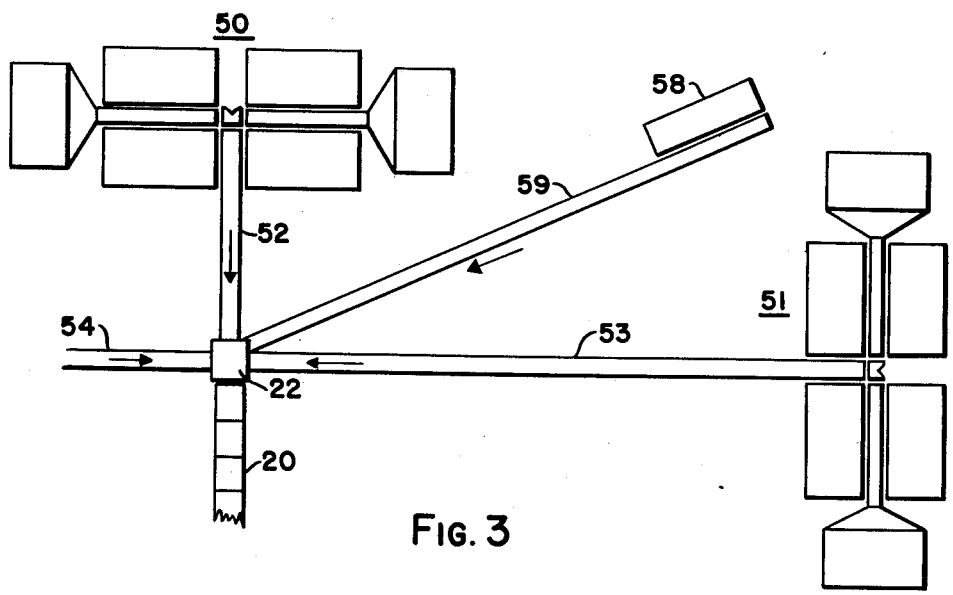

This latter feature makes it possible to extend the number of varieties being handled indefinitely for two or more units of the character shown in Fig. 2 can be combined, as shown in Fig. 3. In the arrangement shown in this figure, the storage area is divided up into a plurality of units 50 and 51, each similar to that shown in Fig. 2 and having associated therewith conveyor belts 52 and 53, respectively. Other banks of dispensing elements may be added, as indicated by the third conveyor belt 54. The conveyor belts, if of different lengths, would preferably be arranged to travel at such differing speeds as to all effect delivery of their respective loads within approximately the same elapsed time interval. In addition, a storage cabinet 58 with its conveyor belt 59 may be provided for handling articles which are manually dispensed as annunciated from the control station as by the method described by my prior Patent No. 2,416,870 granted March 4, 1947. The segregating unit and its delivery apron are indicated at 20 and 22, as in Figs. 1 and 2. It will be evident that an almost unlimited number of items can be handled with this arrangement and the controls hereinafter described at maximum handling rate.

Figure 4:
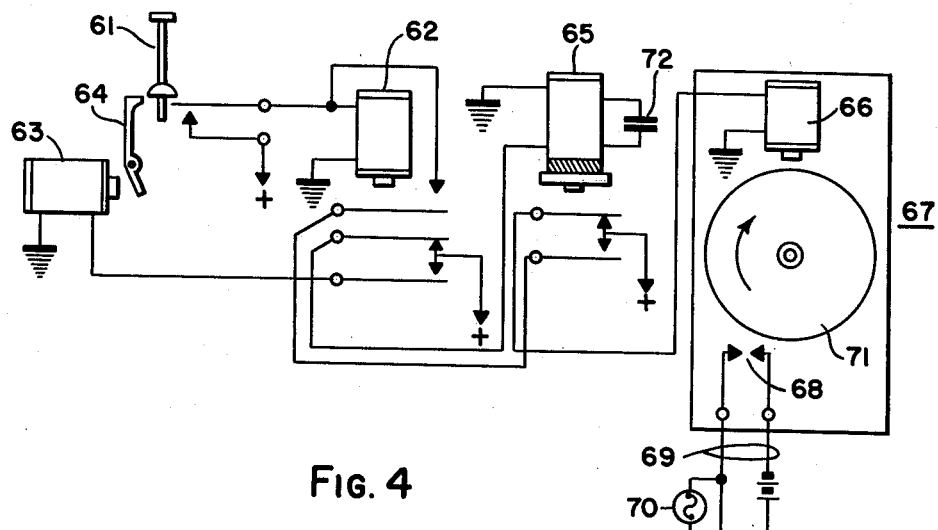
Fig. 4 is a circuit diagram of a preferred control mechanism for the order-segregating unit.
Figure 5:
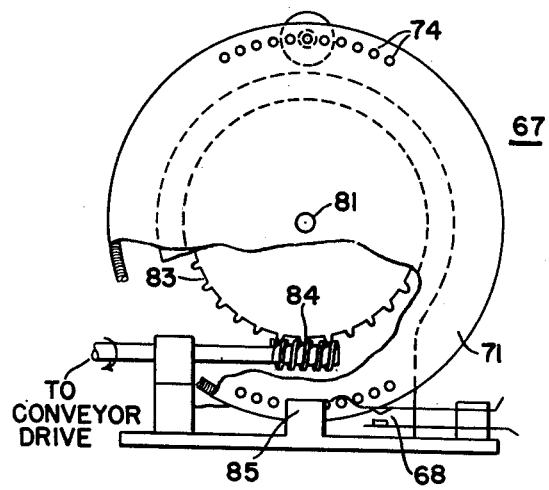
Figs. 5 and 6 are front and side elevations of a preferred construction of timing relay which may be used in the system shown in Fig. 4.
Figure 6:
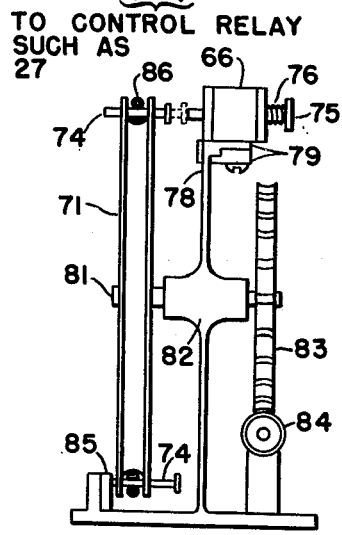

In installations where the storage area must be located at a point considerably removed from the wrapping station or delivery point, the operation of the segregating unit and the movement of the conveyor may be correlated so that the spacing between orders is reduced to a minimum and new orders can be started before the previous order has been received on the segregating unit. Thus portions of two or more orders may be on the long conveyor at the same time without causing confusion of orders at the delivery point. A control system for accomplishing this result is shown in Fig. 4, and the detailed construction of a preferred form of timer is shown in Figs. 5 and 6. This timer as will be explained hereinafter operates as a "memory" device to record or store up the time intervals elapsing between the dispensing of the final times of successive orders from the storage or dispensing elements and actuate the segregating unit after each "final item" reaches the unit, without requiring the conveyor system to be cleared of all items of an order before commencing to make up the next order.

Referring to Fig. 4, a key 61 (the "total" key of the control station or other key operated between separate orders) is arranged to energize a relay 62. The energization of relay 62 closes a locking circuit through its upper front contact and the lower front contact of relay 65 for locking up the relay until the normally energized relay 65 releases its armatures. Relay 62 also closes a circuit through its lower front contact for energizing the latch magnet 63, actuating a latch 64 arranged to prevent re-operation of the key 61 until relay 62 releases. Preferably all of the keys in the keyset are locked up in the same manner. At its middle armature and back contact, relay 62 interrupts the circuit of slow-release relay 65 and, after a set time interval, relay 65 releases its armatures.

Thereupon a circuit is closed from battery through the upper armature and back contact of relay 65 for energizing the electromagnet or solenoid 66 of a timing mechanism 67 provided with contacts 68 which are closed after a predetermined period of time has elapsed from the energization of the magnet 66. The closure of the contacts 68 closes a control circuit 69 for lighting a signal lamp 70 and for initiating the advance of the segregating unit 20, as described above in connection with Fig. 1. As shown, the timing mechanism 67 may comprise a continuously rotating disc 71 having means to actuate the contacts 68, as illustrated in detail in Figs. 5 and 6, or other suitable time-delay mechanism may be employed. The function of the timing mechanism will be explained in connection with the description of Figs. 7 to 10. It will be further noted that the de-energization of relay 65, as described, opens the locking circuit of relay 62 whereupon this relay becomes de-energized. The de-energization of relay 62 opens at its lower armature the circuit of latch magnet 63 and recloses the described circuit of relay 65. Relay 65, which may be shunted by condenser 72 to retard its operation, thus opens the circuit of the magnet 66, and said magnet only receives a momentary operating impulse of current.

As shown in Figs. 5 and 6, a preferred form of timing mechanism adapted to be operated by a momentary current impulse and to close its contacts a predetermined time after the occurrence of said impulse, comprises a series of slidable pins 74 arranged around the periphery of the rotating disc 71 so as to be carried successively in front of the movable armature 75 of the electromagnet 66. The armature 75 is normally biased by a spring 76 to a position where the disc 71 may rotate without displacement of the pins 74. However when a current impulse is impressed upon the magnet 66, the pin 74 which at that instant is in alignment with the armature 75 will be displaced to the left (as viewed in Fig. 6). The pins which are projected from their normal positions, after rotating for a predetermined time interval, engage the upper contact 68 (see Fig. 5) and momentarily depress said contact to close the control circuit. The magnet 66 is preferably adjustable on a concentric support 78, as by a clamp 79, to permit the time delay of the timing mechanism to be changed as desired.

As shown, the disc 71 is mounted on one end of a shaft 81 journalled in a bearing 82, the other end of the shaft carrying a worm wheel 83 meshing with a driving worm or gear 84. The gear 84 is connected to the belt conveyor system to maintain a desired speed ratio thereto or is driven by a constant-speed source of power designed to maintain the speed of the disc 71 synchronized with the conveyor. In order to restore a projected pin to its normal position, an upstanding lug 85 may be provided on the base, said lug having an inner sloping or cam surface arranged to return an actuated pin to normal after it has operated the contacts 68. A coiled spring 86 may be looped around the circular series of pins 74 to aid in maintaining each pin in its retracted or projected position as the disc 71 rotates. With this construction, it will be apparent that each current impulse applied to the electromagnet 66 will actuate one of the pins 74 into a position where, after sufficient time has elapsed for a partial rotation of disc 71, it will momentarily close the contacts 68, the lapse of time being synchronized with the movement of the articles on the belt conveyor.

With this form of operation, relay 25 of Fig. 1 is eliminated and closure of contacts 68 are arranged to operate electromagnet 27 which controls actuation of order segregating belt 20.

The warning device 70, shown by way of example as a lamp, will be operated each time the control circuit 69 is closed by closure of the contacts 68. This signal may be located at the main control station, at the order-segregating unit 20 or any other desired location. This feature is of particular use where instead of an automatically operated order segregating unit, the receiving trays or pallets may be manually shifted. In this case the operation of signal 70 indicates to the attendant that an order has been completed and an empty tray should be moved up to receive the articles or items comprising the next order.

The manner in which the conveyor system is correlated with the order-segregating unit in accordance with the invention will be readily understood from the diagrammatic views of a typical installation shown in Figs. 7 to 10 inclusive. In these figures the dispensing units and the conveyor system for carrying items released therefrom to the assembly or wrapping station, together with the order-segregating unit and the timing mechanism, are shown schematically with the same reference numerals as in Figs. 1 to 6, inclusive. The connection between a driven element of the conveyor and the timing mechanism 67 is represented by the shaft 91. It may be assumed that the distance between the assembly point and the most remote dispensing unit is such that ten or fifteen seconds or more are required to transfer an item from said unit to the assembly point. The purpose of the control system is to enable another order or orders to be commenced before the last item of a preceding order has reached the order-segregating unit 20, said unit being operated at the proper times to prevent commingling the articles of separate orders.

After the last item of a particular order has been selected, the "total" key is operated which after a certain time interval causes a pin 74 to be projected to the "contact-operating" position where it will operate the contacts 68 after the time disc 71 has rotated through a predetermined angle as described above. The time required for this movement is just sufficient to enable an item from the most remote dispensing unit to reach the segregating unit 20. In Fig. 7, the items of one order (labelled "1st Order") are being delivered to the order-segregating unit 20, the items of the second order are being transferred to the delivery point and the last item of the third order has just been released from its dispensing unit. At this time the operation of the "total" key 61 locks up the keyset to insure proper spacing between the third order and the succeeding order. Fig. 8 illustrates the condition after the last item of the first order has reached the order-segregating unit, with the lowermost pin 74 about to engage contacts 68. In the meantime the conveyor belt continues its movement. Fig. 9 illustrates the progression of the order-segregating belt after the contacts 68 are closed, the conveyor having advanced to a position where the items of the second order are about to be delivered to the unit 20. In Fig. 10, the pin 74 representing the third order has been actuated to the operative position and the second order is being delivered to the order-segregating unit. The conveyor belt having advanied sufficiently to space the third and fourth orders, the keyset is unlocked and the assembly of the fourth order may be commenced. The timer disc 71, with its operating mechanism and associated contacts 68, thus serves as a "memory" device to store up the final item actuations of each order and control the segregating unit at the proper times to separate successive orders, even though such actuations occur with random spacing. It will thus be seen that the spacing of separate orders on the conveyor system is merely sufficient to maintain the integrity of each order at the delivery or assembly point, and parts of two or more orders may be in the process of assembly at the same time. Therefore the efficiency of the system, in terms of orders handled per hour, is increased, especially in the case of relatively long conveyors or storage bins spread over a large area.

Although reference has been made in the foregoing description to the handling of "orders" as in the case of retail or wholesale stores, it is to be understood that the term is intended to include other arbitrary groups of articles to be assembled such, for example, as piece parts for production control in a manufacturing plant.

The various elements of the system may take various forms, those shown being merely exemplary. The order-segregating unit, instead of being of the intermittently movable type or employing separate trays or carriers as explained above, may comprise a plurality of continuously moving belts or tables, with a pivoted valve or gate for alternately directing the items of each order to first one and then another belt or table. Other modifications in structural details will occur to those skilled in the art and may be made without departing from the scope of the invention.

I claim:

1. In an article distribution system having a substantially continuously operating conveyor, in combination, a timing mechanism having a movable supporting member synchronized with the conveyor so that progressive movement of a point thereon corresponds to the movement of an article on said conveyor, a plurality of elements on said supporting member each displaceable from a normal to an actuated position, said elements arranged in series relation on said supporting member to represent possible spaced or successive articles on the conveyor, means to actuate individually any of said elements from the normal position to store article-conveying information on said timing mechanism concerning the location of the corresponding article and a control device in the path of any element which is in its actuated position, to be operated after the movable supporting member has effected a predetermined movement.

2. A system according to claim 1 in which the supporting member of the timing mechanism consists of a rotating disc and the displaceable elements are pins around the periphery of said disc.

3. A system according to claim 1 in which said control device consists of an electric switch and means to control the conveyor is connected to said switch.

4. In an article order assembly system, in combination, means for releasing wanted articles, said articles composing separate orders or groups, conveyor means for transferring said articles to a collection point and means including a multiple-storage timing mechanism capable of storing a plurality of final-item actuations for causing physical separation of the groups of articles being transferred at the same time on the conveyor means when articles are released in such rapid succession that items of one or more additional groups are being transferred by said conveyor means as the last item of a previous order reaches the collection point.

5. In an article order assembly system including a storage area from which articles may be selected to fill orders, in combination, means including a conveyor belt for conveying wanted articles from the storage area to a collection point, selecting means for releasing articles onto said belt at different points along the length thereof, means for spacing a multiplicity of orders on said conveyor belt for transfer at the same time to the collection point and means for operating the order-segregating means in consonance with the arrival at the collection point of the last item of each order.

6. In an article order assembly system, in combination, means for releasing wanted articles, said articles composing separate orders or groups to be separately assembled, a conveyor system for transferring said articles to a collection or assembly point and order-segregating means at said collection point, said order-segregating means comprising an element to be operated as the final item or article of each group reaches the order-segregating means on said conveyor system and means including a multiple-unit timer capable of simultaneously storing a plurality of final-item actuations for operating said element at the proper times.

7. In an article order assembly system including a storage area from which articles may be selected to fill orders, in combination, means for conveying desired articles from said storage area to a collection point, means for segregating articles composing separate groups or orders as they are conveyed to deliver them as separate orders at the collection point when parts of separate orders are being conveyed to the collection point simultaneously, an intermittently operated segregating element or indicator at the collection point and means for operating said element in consonance with the spacing of the final items of groups or orders on the conveying means.

8. In an article distribution system, in combination, means for conveying a multiplicity of articles seriatim from starting to delivery points, an article control device or indicator to be operated substantially at the time of arrival of one of said articles at a delivery point and timing mechanism for operating said control device, said timing mechanism comprising a movable member synchronized with the rate of travel of the articles being conveyed, a series of actuating elements on said movable member representing the positions of articles being conveyed and means controlled thereby when an element reaches a predetermined position for operating said article control device or indicator.

9. In an article distribution system, in combination, means for conveying a multiplicity of articles seriatim from starting to delivery points, a timing mechanism synchronized with said article-conveying means an article-handling means at a delivery point operated by said timing mechanism, said mechanism comprising a series of movable actuator elements, means for advancing said elements as a group to correspond with the movement of articles on said conveying means, means for moving said actuator elements from inactive to active positions, operating means for said article-handling means at a fixed point in the travel of said actuator elements, means whereby any actuator element which is in the active position actuates said operating means and means for resetting said actuator elements from the active to the inactive positions.

PAUL M. FARMER.

REFERENCES CITED

The following references are of record in the file of this patent:

UNITED STATES PATENTS

| Number | Name | Date |
|---|---|---|
| 1,395,727 | Odermatt | Nov. 1, 1921 |
| 1,602,753 | Davis | Oct. 12, 1926 |
| 1,773,885 | Staley | Aug. 26, 1930 |
| 2,276,294 | Farmer | Mar. 17, 1942 |
| 2,347,346 | Wright | Apr. 25, 1944 |
| 2,374,537 | Goldsmith | Apr. 24, 1945 |